United States Patent Office.

JOHN AHEARN, OF BALTIMORE, MARYLAND, ASSIGNEE OF BENJAMIN BEST.

*Letters Patent No.* 78,569, *dated June* 2, 1868; *reissue No.* 3,728, *dated November* 16, 1869.

IMPROVED COMPOSITION FOR DESTROYING INSECTS ON FRUIT-TREES.

The Schedule referred to in these Letters Patent and making part of the same.

*To all whom it may concern:*

Be it known that BENJAMIN BEST, of Dayton, in the county of Montgomery, and State of Ohio, did invent an Improved Protector for Preserving Fruit and other Trees from Injury by Insects; and I do hereby declare that the following is a full, clear, and exact description of the same.

The improved protector consists of a composition compounded from the following ingredients, in about the proportion stated:

To thirty gallons of rain-water, add one pound of carbonate of ammonia, one pound of potash, one gallon of whale-oil, one quart of pine-tar, and one quart of coal-tar.

These ingredients should be thoroughly mixed in a barrel, or any convenient vessel, and let stand for six hours, when the composition is ready for use. It should be kept in a tight barrel, or cask, and stirred well each time before using.

*Directions for Using on Fruit-Trees and Grape-Vines.*

As soon as the frost is out of the ground in the spring, loosen the earth around the root of the tree, then apply the mixture to the limbs and trunk, scrubbing them severely with an old broom or brush, and saturate the roots well, so as to kill such grubs and worms as have taken hold.

If this is done three times a year—in the spring, about the first of July, and in the fall—the trees and fruit will be safe from grubs and worms, and a large crop may be depended upon if the season be favorable.

*To Prevent the Curculio.*

When the blossoms are opening, take a small band of cotton, wool, old carpet, or sheep-skin, and tie it loosely around the tree, up near the first limbs. Wet the band when put on, and once a week after, until the fruit is ripe, and no curculio will touch it during the season.

What I claim, as the invention of BENJAMIN BEST, and desire to secure by Letters Patent, is—

1. A composition, compounded of the above-named ingredients, with or without the coal-tar, substantially as set forth.

2. The mode of protecting trees, by the application of the hereinbefore-described composition to bands of fibrous material surrounding the tree, substantially as described.

J. AHEARN.

Witnesses:
N. K. ELLSWORTH,
CHAS. A. PETTIT.